US008667237B2

(12) United States Patent
Benhase, Jr. et al.

(10) Patent No.: US 8,667,237 B2
(45) Date of Patent: *Mar. 4, 2014

(54) DELETING RELATIONS IN MULTI-TARGET, POINT-IN-TIME-COPY ARCHITECTURES WITH DATA DEDUPLICATION

(75) Inventors: Michael Thomas Benhase, Jr., Tucson, AZ (US); Theresa Mary Brown, Tucson, AZ (US); Lokesh Mohan Gupta, Tucson, AZ (US); Carol Santich Mellgren, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 347 days.

This patent is subject to a terminal disclaimer.

(21) Appl. No.: 13/043,398

(22) Filed: Mar. 8, 2011

(65) Prior Publication Data

US 2012/0233404 A1    Sep. 13, 2012

(51) Int. Cl.
*G06F 12/12* (2006.01)
(52) U.S. Cl.
USPC .................... 711/162; 711/117; 711/E12.069
(58) Field of Classification Search
USPC .................................. 711/162, 117, E12.069
See application file for complete search history.

(56) References Cited

U.S. PATENT DOCUMENTS

| 7,301,448 B1 | 11/2007 | Usery et al. |
| 7,360,048 B2 | 4/2008 | Agombar et al. |
| 7,472,242 B1 | 12/2008 | Deshmukh et al. |
| 2004/0260882 A1 | 12/2004 | Martinez et al. |
| 2006/0129775 A1 | 6/2006 | Hulsey |
| 2008/0114951 A1* | 5/2008 | Lee ................................ 711/162 |
| 2008/0189482 A1 | 8/2008 | Fuente |
| 2009/0287878 A1 | 11/2009 | Yamamoto et al. |
| 2009/0307453 A1* | 12/2009 | Benhase et al. ................ 711/165 |

OTHER PUBLICATIONS

NFS, "COS 318: Operating Systems—NSF, Snapshot, Dedup and Review," last accessed at: http://www.cs.princeton.edu/courses/archive/fall08/cos318/lectures/Lec21-NFS-Snapshots.pdf, 2009-2010.
IBM Corporation, "IBM System Storage SAN Volume Controller, Host Attachment Guide—Errata," last accessed at: ftp://ftp.software.ibm.com/storage/san/sanvc/V4.3.1/pubs/multi/HAG_errata.pdf, May 20, 2009.
Osuna, et al., IBM Corporation, "TS7680 Deduplication ProtecTIER Gateway for System Z," last accessed at: http:// www.redbooks.ibm.com/abstracts/sg247796.html?Open, 2010.
USPTO Office Action, Application 13/043,389, Notification Date: Mar. 29, 2013.

* cited by examiner

*Primary Examiner* — Yong Choe
(74) *Attorney, Agent, or Firm* — Nelson and Nelson; Daniel P. Nelson; Alexis V. Nelson

(57) ABSTRACT

A method for deleting a relation between a source and a target in a multi-target architecture is described. The multi-target architecture includes a source and multiple targets mapped thereto. In one embodiment, such a method includes initially identifying a relation for deletion from the multi-target architecture. A target associated with the relation is then identified. The method then identifies a sibling target that inherits data from the target. Once the target and the sibling target are identified, the method copies the data from the target to the sibling target. The relation between the source and the target is then deleted. A corresponding computer program product is also disclosed and claimed herein.

10 Claims, 14 Drawing Sheets

| Track | Target Volume 1 (TV1) | | Target Volume 2 (TV2) | |
|---|---|---|---|---|
| | TBM | Extent Data | TBM | Extent Data |
| 1 | 0 | SV Data | 0 | TV2 Data |
| 2 | 1 | | 0 | SV Data |
| 3 | 1 | | 1 | |
| 4 | 1 | | 1 | |
| 5 | 1 | | 1 | |
| 6 | 1 | | 1 | |

Fig. 10

| Track | Target Volume 1 (TV1) | | Target Volume 2 (TV2) | | Target Volume 3 (TV3) | |
|---|---|---|---|---|---|---|
| | TBM | Extent Data | TBM | Extent Data | TBM | Extent Data |
| 1 | 0 | SV Data | 0 | TV2 Data | 1 | |
| 2 | 1 | | 0 | SV Data | 1 | |
| 3 | 1 | | 1 | | 0 | SV Data |
| 4 | 0 | SV Data | 0 | TV2 Data | 1 | |
| 5 | 0 | TV1 Data | 1 | | 1 | |
| 6 | 1 | | 0 | SV Data | 0 | TV3 Data |

DELETING RELATIONS IN MULTI-TARGET, POINT-IN-TIME-COPY ARCHITECTURES WITH DATA DEDUPLICATION

BACKGROUND

1. Field of the Invention

This invention relates to data replication, and more particularly to apparatus and methods for creating point-in-time copies of data while minimizing data duplication.

2. Background of the Invention

Data replication functions such as IBM's Flash Copy, Hitachi's ShadowImage, or the like, may be used to generate nearly instantaneous point-in-time copies of logical volumes or datasets. Among other uses, these point-in-time copies may be used for disaster recovery and business continuity purposes. IBM's Flash Copy in particular creates a point-in-time copy by establishing a relation (or "mapping") between a source volume and a target volume. Once this relation is established, data may be read from either the source volume or target volume. A target bit map associated with a target volume keeps track of which data tracks have actually been copied from the source volume to the target volume. In certain cases, volumes may be arranged in a cascaded configuration such that certain volumes function as both targets and sources. In other cases, volumes may be arranged in a flat (or "multi-target") configuration such that a source volume has relations with multiple target volumes.

Nevertheless, I/O performance can be impacted significantly as the number of volumes increases in either a cascaded or multi-target configuration. For example, in a cascaded configuration, a write to a source volume may need to wait for data to be copied between various volumes in the cascade before the write can be performed. Thus, the larger number of volumes in the cascade, the larger number of copies that need to occur before data can be written to the source volume. Similarly, in a multi-target configuration, a write to a source volume may need to wait for data to be copied to each connected target before the write can be performed. The larger number of volumes in the multi-target configuration, the larger number of copies that need to occur before data can be written to the source volume. This can make a write to a source volume very slow. For this reason, current Flash Copy implementations typically only allow a limited number of targets in a multi-target configuration to keep the performance impact within an acceptable range.

In view of the foregoing, what are needed are methods to reduce the performance impact of having large numbers of volumes in cascaded or multi-target configurations. For example, methods are needed to reduce data duplication in cascaded or multi-target configurations when performing reads and writes thereto. Further needed are methods to efficiently delete relations in cascaded or multi-target configurations.

SUMMARY

The invention has been developed in response to the present state of the art and, in particular, in response to the problems and needs in the art that have not yet been fully solved by currently available methods. Accordingly, the invention has been developed to provide methods for deleting relations between sources and targets in multi-target architectures. The features and advantages of the invention will become more fully apparent from the following description and appended claims, or may be learned by practice of the invention as set forth hereinafter.

Consistent with the foregoing, a method for deleting a relation between a source and a target in a multi-target architecture is disclosed. The multi-target architecture includes a source and multiple targets mapped thereto. In one embodiment, such a method includes initially identifying a relation for deletion from the multi-target architecture. A target associated with the relation is then identified. The method then identifies a sibling target that inherits data from the target. Once the target and the sibling target are identified, the method copies the data from the target to the sibling target. The relation between the source and the target is then deleted.

A corresponding computer program product is also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 10 and 11 are tables showing data and TBM values for the volumes illustrated in FIG. 9 after various writes are made thereto;

DETAILED DESCRIPTION

Figure 1:
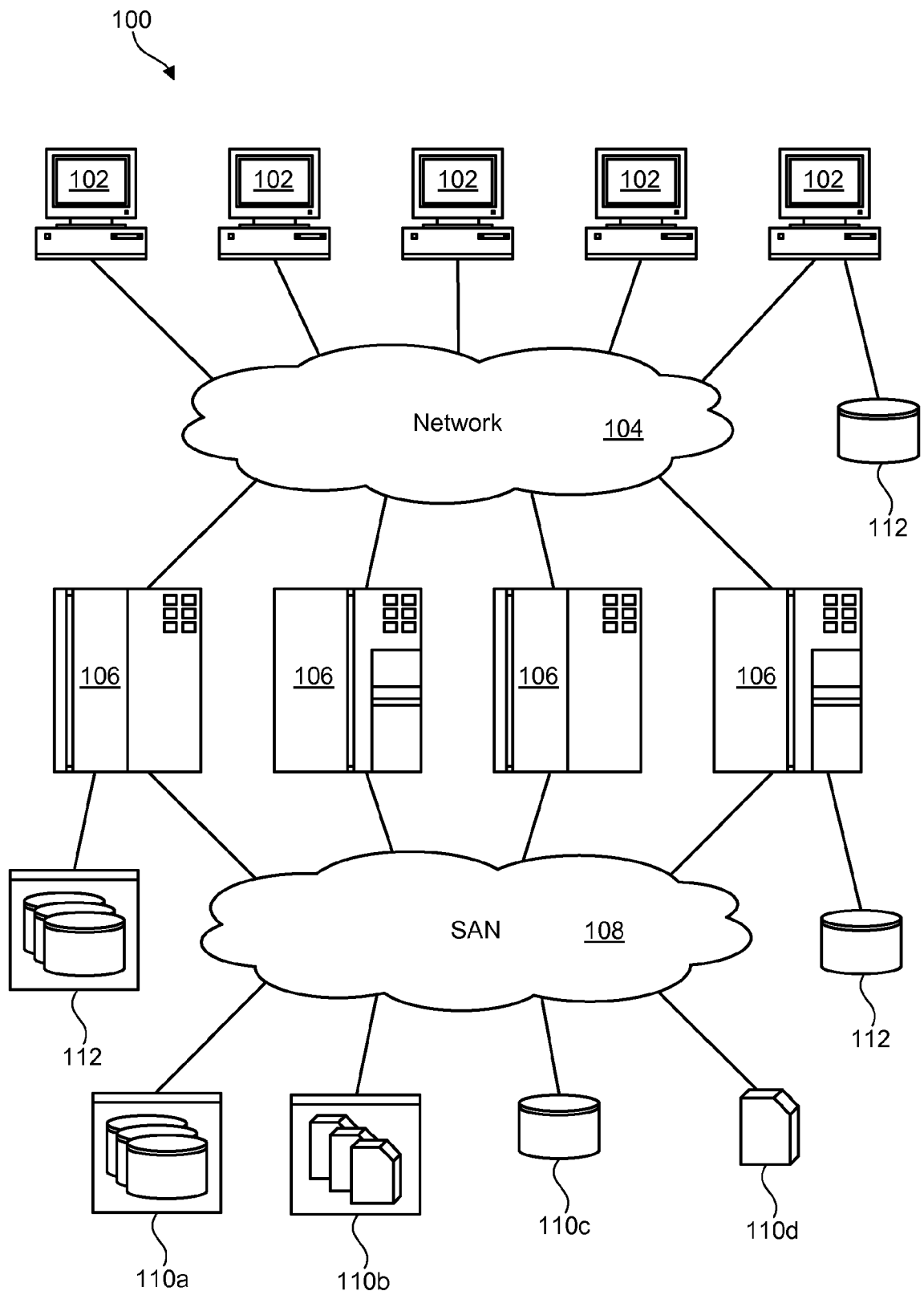
FIG. 1 is a high-level block diagram showing one example of a network architecture comprising various types of storage systems.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where a point-in-time-copy methodology in accordance with the invention may be implemented. The network architecture 100 is presented only by way of example and not limitation. Indeed, the methodology disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may utilize the point-in-time-copy methodology disclosed herein.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may utilize the point-in-time-copy methodology disclosed herein.

Figure 2:
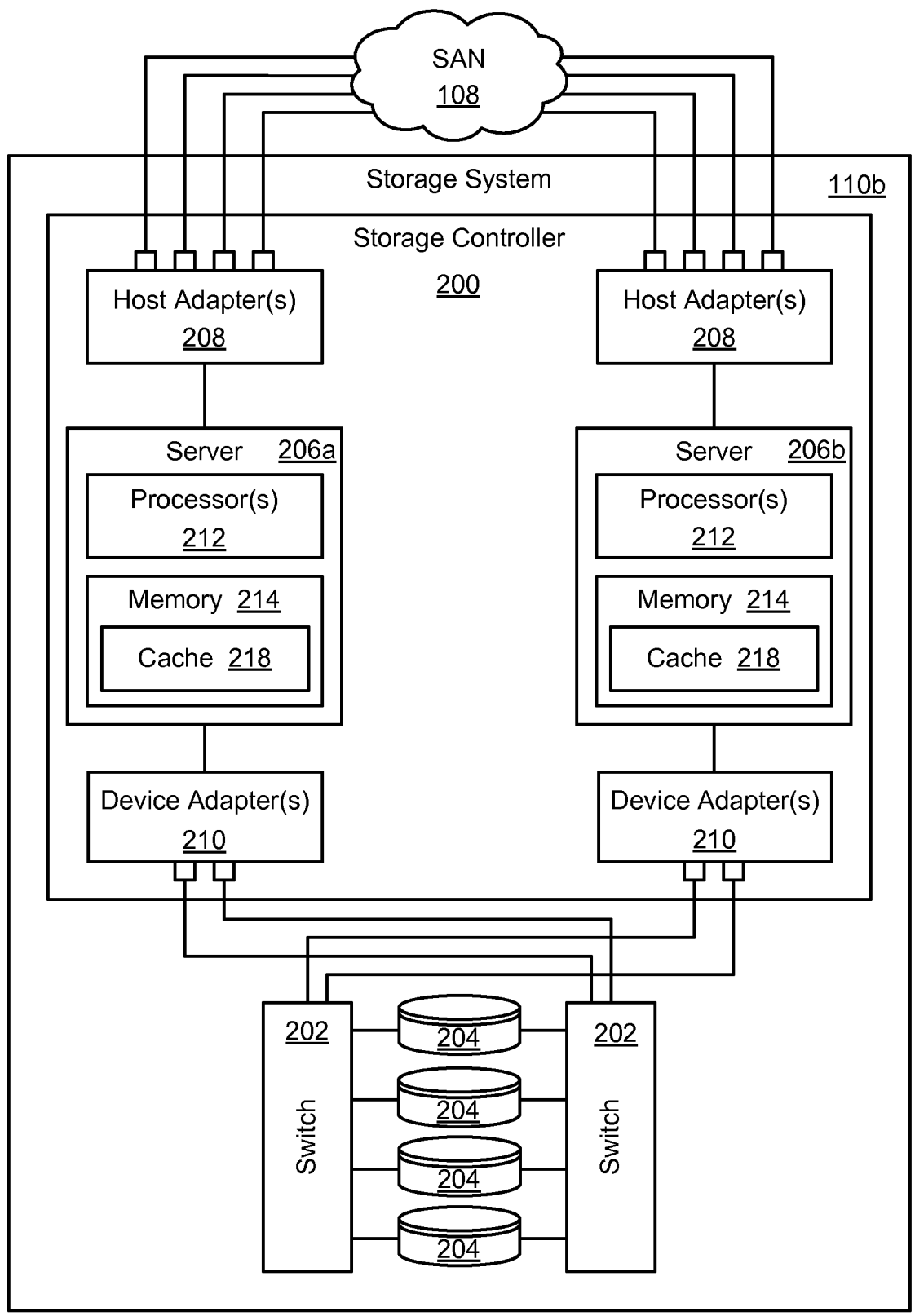
FIG. 2 is a high-level block diagram showing one example of a storage system where a methodology in accordance with the invention may be implemented.

Referring to FIG. 2, one embodiment of a storage system 110b containing an array of hard-disk drives 204 and/or solid-state drives 204 is illustrated. The internal components of the storage system 110b are shown since the point-in-time-copy methodology disclosed herein may, in certain embodiments, be implemented within such a storage system 110b, although the methodology may also be applicable to other storage systems 110. As shown, the storage system 110b includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

One example of a storage system 110b having an architecture similar to that illustrated in FIG. 2 is the IBM DS8000™ enterprise storage system. The DS8000™ is a high-performance, high-capacity storage controller providing disk storage that is designed to support continuous operations. Nevertheless, the methods disclosed herein are not limited to the IBM DS8000™ enterprise storage system 110b, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. The servers 206 may host at least one instance of these software modules. These software modules may manage all read and write requests to logical volumes in the storage devices 204.

In selected embodiments, the memory 214 includes a cache 218. Whenever a host 106 (e.g., an open system or mainframe server 106) performs a read operation, the server 206 that performs the read may fetch data from the storages devices 204 and save it in its cache 218 in the event it is needed again. If the data is requested again by a host 106, the server 206 may fetch the data from the cache 218 instead of fetching it from the storage devices 204, saving both time and resources. Similarly, when a host 106 performs a write, the server 106 that receives the write request may store the write in its cache 218. The server 106 may then destage the write to the storage devices 204 as time and resources allow.

Figure 3:
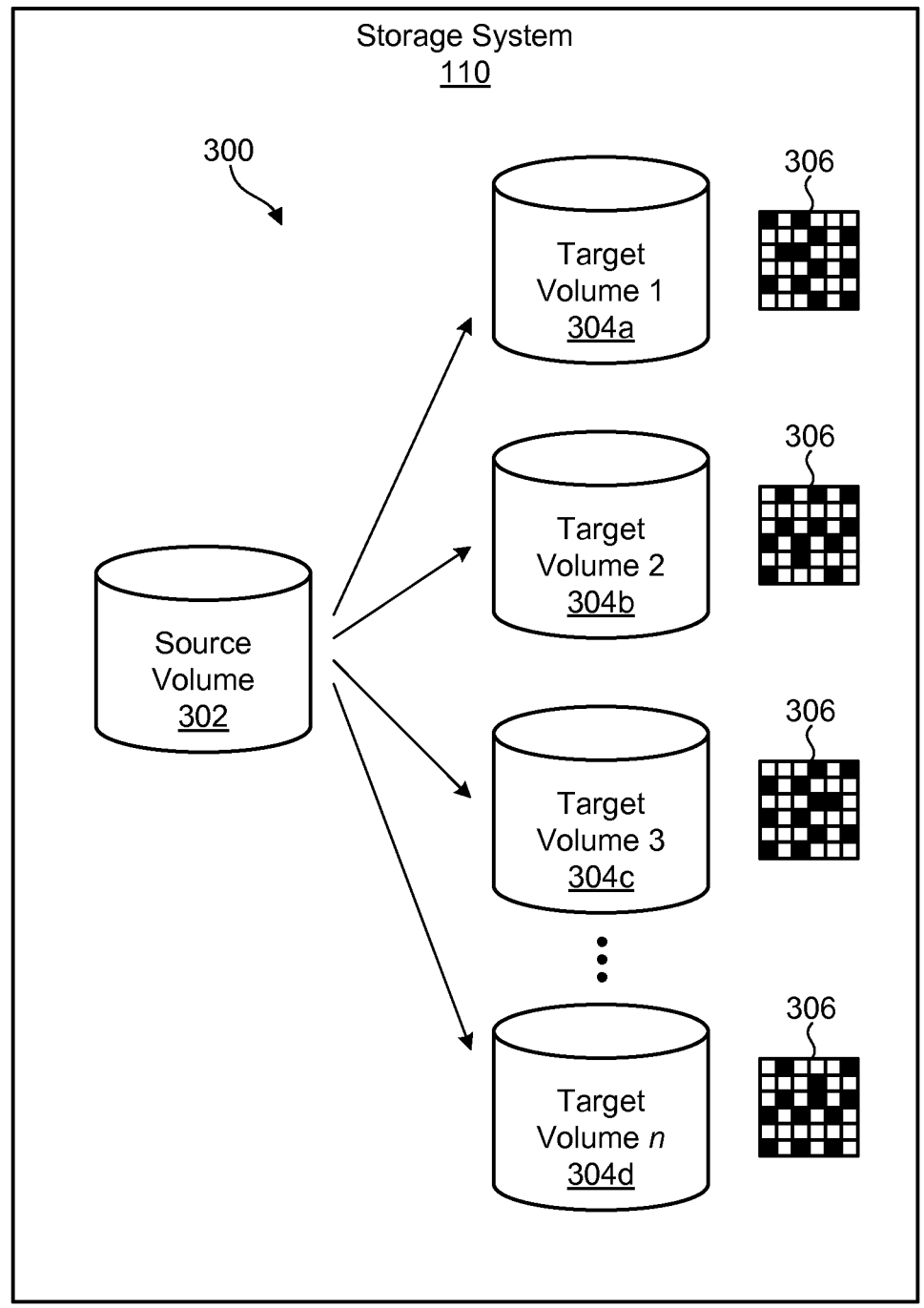
FIG. 3 is a high-level block diagram showing one example of a multi-target architecture comprising a source volume mapped to multiple target volumes.

Referring to FIG. 3, one example of a multi-target architecture 300 for creating point-in-time copies is illustrated. Such an architecture 300 may be implemented within a storage system 110, such as the storage system 110b illustrated in FIG. 2. As shown, the multi-target architecture 300 includes a source volume 302 and one or more target volumes 304a-d. Each of the target volumes 304a-d contains a point-in-time copy of data in the source volume 302. In selected embodiments, such as in Flash Copy implementations, a point-in-time copy is created by establishing a relationship (or "mapping") between a source volume 302 and a target volume 304. Once this relationship is established, data may be read from either the source volume 302 or target volume 304 even though data may still not be copied from the source volume 302 to the target volume 304. A target bit map (TBM) 306 associated with a target volume 304 keeps track of which data tracks have actually been copied from the source volume 302 to the target volume 304. For example, a "0" in the TBM 306 may indicate that a data track has been copied (i.e., the target volume 304 has its own data), whereas a "1" may indicate that a data track has not yet been copied. In cases where the TBM 306 contains a "1," a read to a track on the target volume 306 may be directed to the corresponding track on the source volume 302. For the purposes of this disclosure, a bit in a TBM 304 is said to be "set" if it contains a "1" and "reset" if it contains a "0," although this could be reversed in other embodiments. Although the source 302 and targets 304 are labeled as "volumes" in the illustrated embodiment, it should be recognized that the source 302 and targets 304 could also be datasets or other collections of data.

As previously mentioned, in conventional multi-target architectures 300, a write to a source volume 302 may need to wait for data in the source volume 302 to be copied (i.e., destaged) to each connected target volume 304a-d not containing its own data before the write can be completed to the source volume 302. That is, before a write is performed on a data track of the source volume 302, the existing data track needs to be copied to target volumes 304a-d that do not already contain the data track before the data track on the source volume 302 is overwritten. The larger the number of target volumes 304a-d in the multi-target architecture 300, the larger number of copies that need to occur before data can be successfully written to the source volume 302. This can make a write to the source volume 302 very slow. For this reason, conventional point-in-time-copy technologies may only support a limited number (e.g., twelve) of targets 304 in multi-target architectures 300 to keep the performance impact within an acceptable range.

As will be explained in more detail hereafter, an improved methodology in accordance with the invention may be used reduce the performance impact of having multiple target volumes 304a-d mapped to a source volume 302. Instead of copying data to multiple targets 304a-d when a write is performed on the source volume 302, the improved methodology copies the data to a single target 304 or a subset of the targets 304. An inheritance scheme then enables other targets 304 to inherit the data from the single target 304 or subset of targets 304 that contain the data. In this way, a write to a source volume 302 may only need to copy data to a single target 304 or a subset of the targets 304 before the write can be completed on the source volume 302. The flow diagrams illustrated in FIGS. 4 through 8 show various specific examples of methods to implement such a methodology.

Figure 4:
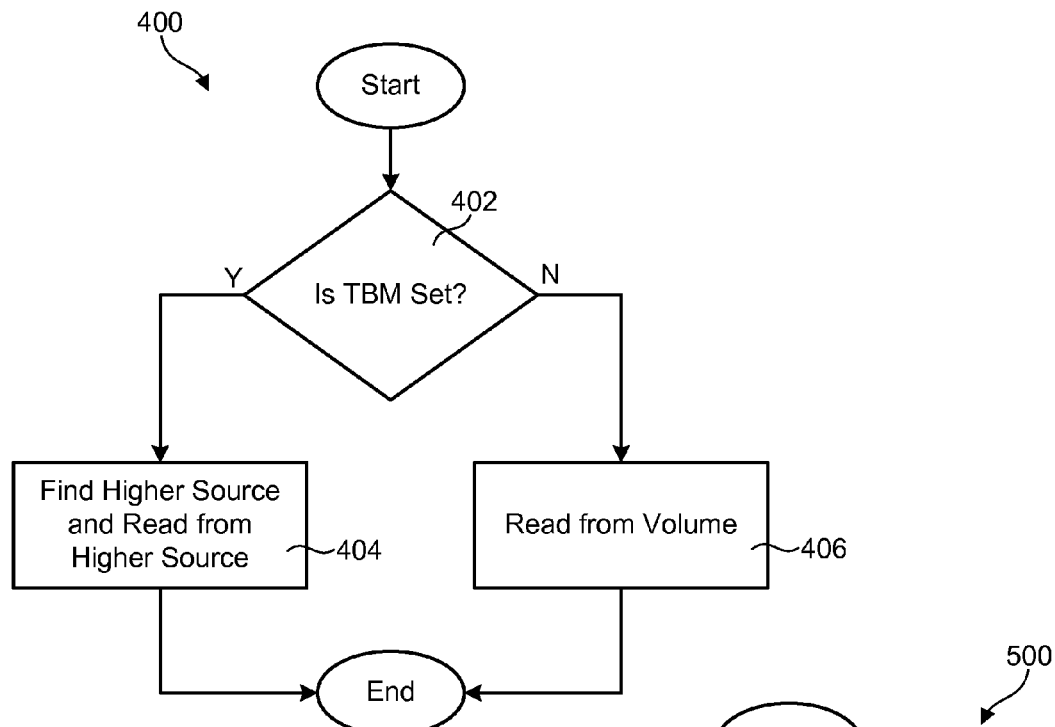
FIG. 4 is a high-level block diagram showing one embodiment of a method for reading a track from a target volume.

Referring to FIG. 4, one example of a method 400 for reading a track from a target volume 304 is illustrated. Upon receiving a request to read a data track from a target volume 304, the method 400 determines 402 whether the TBM of the target volume 304 is set. If the TBM is not set (indicating that the target volume 304 contains the requested data), the method 400 simply reads 406 the requested data track from the target volume 304. On the other hand, if the TBM is set (indicating that the target volume 304 does not contain the requested data), the method 400 finds 404 a higher source (HS) volume from which to read the data, and reads 404 from the HS volume. One method 700 for finding the HS volume is described in association with FIG. 7. For the purposes of this disclosure, the HS volume is the volume that contains the requested data and from which the target volume 304 inherits.

Figure 5:
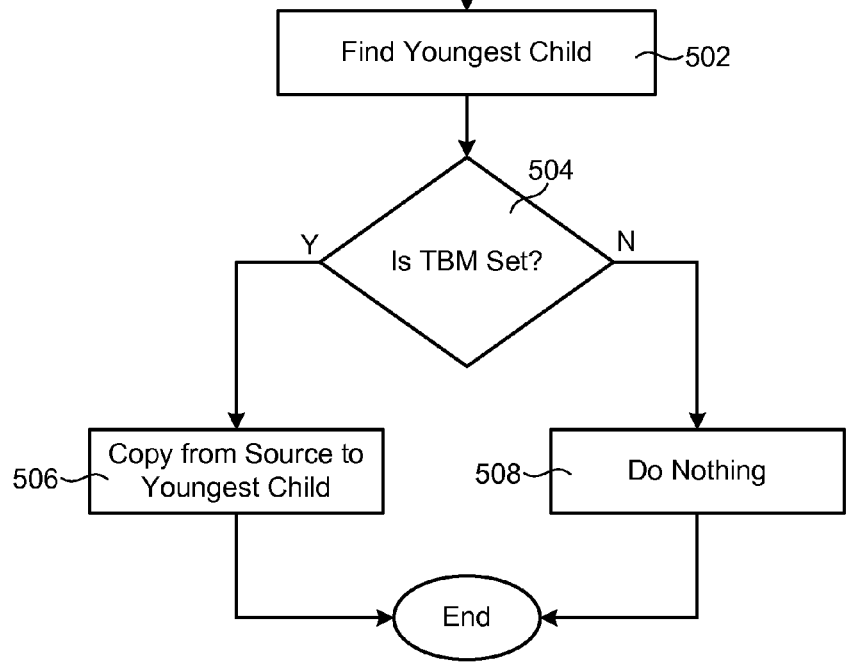
FIG. 5 is a flow diagram showing one embodiment of a method for copying a data track in response to a write to a source volume.

Referring to FIG. 5, one embodiment of a method 500 for destaging a data track in response to a write to a source volume 302 is illustrated. As shown, the method 500 initially finds 502 the youngest child (YC) of the source volume 302. For the purposes of this disclosure, the YC is the target volume 304 that was last mapped to the source volume 302. In selected embodiments, generation numbers (GNs) may be used to determine the order in which target volumes 304 were added to the source volume 302 in order to generate point-in-time copies. The manner in which GNs are used to determine the order the targets 304 were mapped to the source volume 302 will be discussed in association with FIG. 9.

Once the method 500 finds the YC, the method 500 determines 504 whether the TBM of the YC is set. If the TBM is not set (indicating that the YC 304 contains its own copy of the data), the method 500 does nothing 508 since the YC 304 already has a copy of the data. On the other hand, if the TBM is set (indicating that the YC 304 does not contain its own copy of the data), the method 500 copies 506 the data from the source volume 302 to the YC 304. In this way, when a write occurs to the source volume 302, a single copy is made between the source volume 302 and the YC 304 as opposed to copying the data to all target volumes 304 not containing the data. The other target volumes 304 (not the YC 304) may then inherit this data from the YC 304, such as when a read is made to the other volumes 304 or when data is copied from the other volumes 304.

Figure 6:
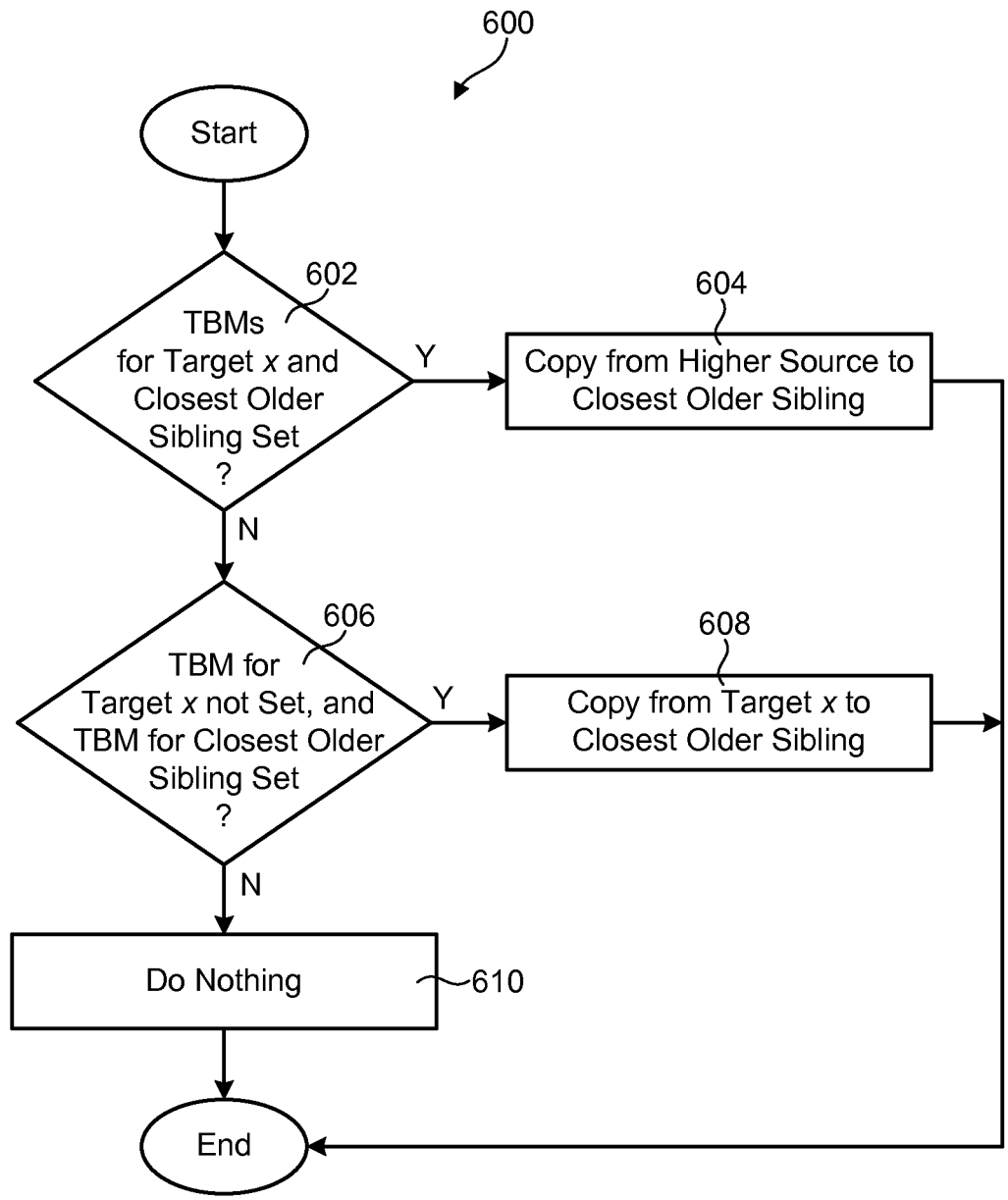
FIG. 6 is a flow diagram showing one embodiment of a method for copying a data track in response to a write to a target volume.

Referring to FIG. 6, one embodiment of a method 600 for destaging a data track in response to a write to a target volume 304 (target x) is illustrated. As shown, the method 600 initially determines 602 whether the TBMs for the target x 304 and the closest older sibling (COS) 304 are set for the track that is being written to. For the purposes of this disclosure, the COS is the target volume 304 that was mapped just before the target x 304. If both of the TBMs are set (indicating that neither volume contains the data in the track being written to), the method 600 copies 604 the data track from the higher source (HS) volume to the COS 304. A method for finding the HS volume will be discussed in association with FIG. 8. On the other hand, if the TBM for the target x is not set and the TBM for the COS is set (indicating that the target x 304 contains data in the data track being overwritten), as determined at step 606, the method 600 copies 608 the data track from the target x to the COS 304—i.e., the data track is destaged from the target x 304 to the COS 304. On the other hand, if the TBM of the COS is not set (indicating that the COS contains the data), or there is no COS, the method 600 does nothing 610 since no copy is needed. Once the end of the method 600 is reached, the write may be performed on the target x.

It should be recognized that the methods 500, 600 described above could be modified in various ways without departing from the essence of the invention. For example, the youngest child (YC) could be replaced by the oldest child, and the closest older sibling (COS) could be replaced by the closest younger sibling. Thus, for the purposes of this disclosure, embodiments that utilize the YC and the COS are also deemed to encompass embodiments that utilize the oldest child and closest younger sibling. Other variations are also possible and within the scope of the invention.

Figure 7:
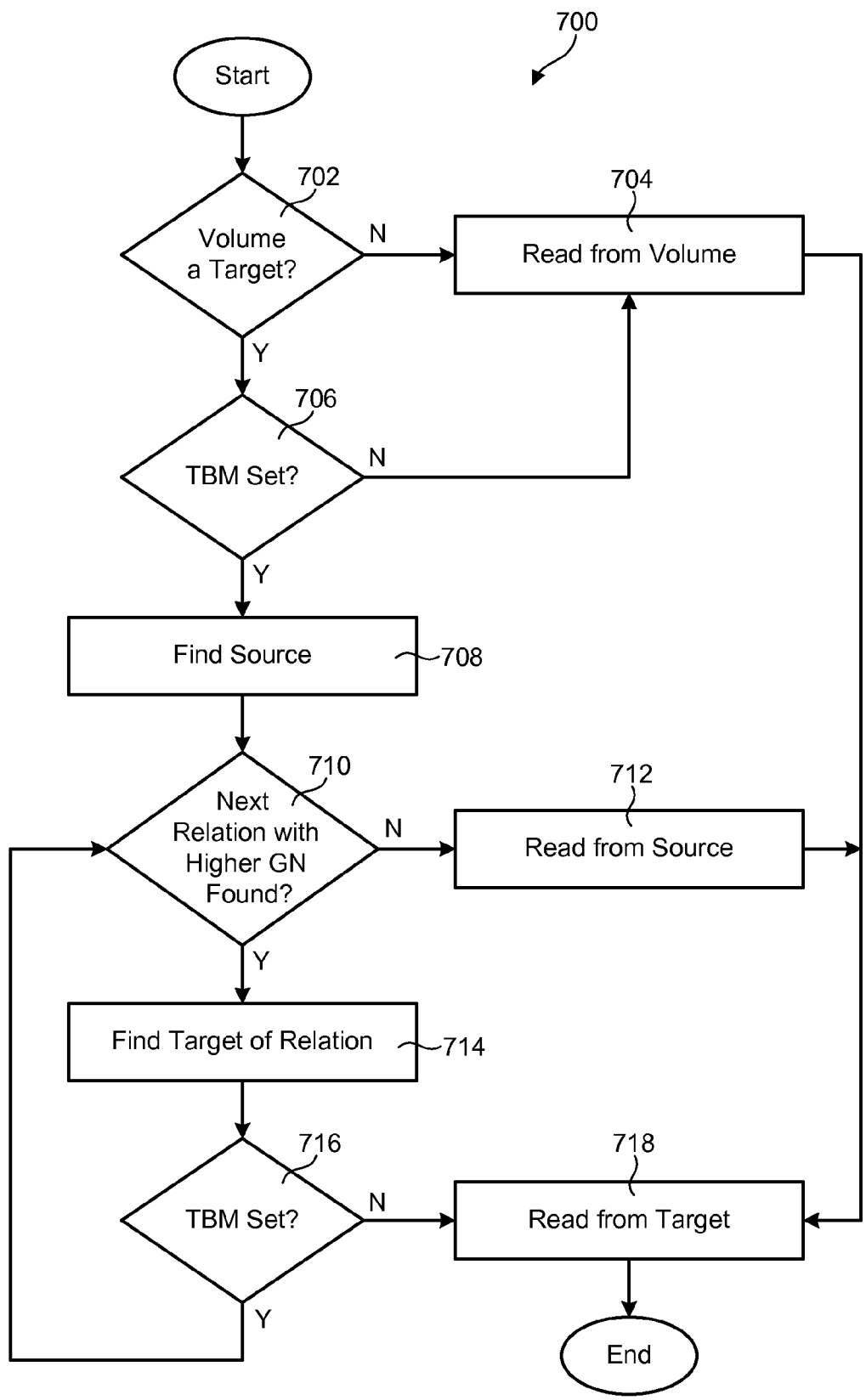
FIG. 7 is a flow diagram showing one embodiment of a method for finding a higher source (HS) volume in response to a read to a volume.

Referring to FIG. 7, one embodiment of a method 700 for finding the HS volume for a read is illustrated. Such a method 700 may be used in association with step 404 of FIG. 4. As shown, the method 700 initially determines 702 whether the volume being read is a target volume 304. If not, the method 700 reads 704 from the volume since it is a source volume 302. If the volume is a target volume 304, the method determines 706 whether the TBM of the volume is set. If the TBM is not set, the method 700 reads 704 from the volume 304. If the TBM of the volume is set, the method 700 finds 708 the source volume 302 associated with the target volume 304. The method 700 then finds 710 the next relation with a generation number (GN) just higher than that of the subject target volume 304. The manner in which the GNs are used will be explained in more detail in the example of FIG. 9.

In general, the decision step 710 finds the relation on the source volume 302 that is just younger than the relation associated with the subject target volume 304 (as identified at step 702). The method 700 then finds 714 the target 304 of this relation. If the TBM of this target 304 is set 716, the method 700 reads from the target 304. If the TBM of this target 304 is not set 716, the method 700 repeats steps 710, 714 to find the next younger target 304 and determine 716 whether its TBM is set. In this way, the method 700 traverses through the younger siblings of the target volume 304 identified at step 702 until the target volume 304 containing the desired data is found. Once this data is found, the method 700 reads 718 from the target 304. If no younger sibling target 304 containing the desired data is found, the method 700 simply reads 712 from the source volume 302. In this way, a target volume 304 is able to inherit data from a sibling 304 when a read is performed thereto.

Figure 8:
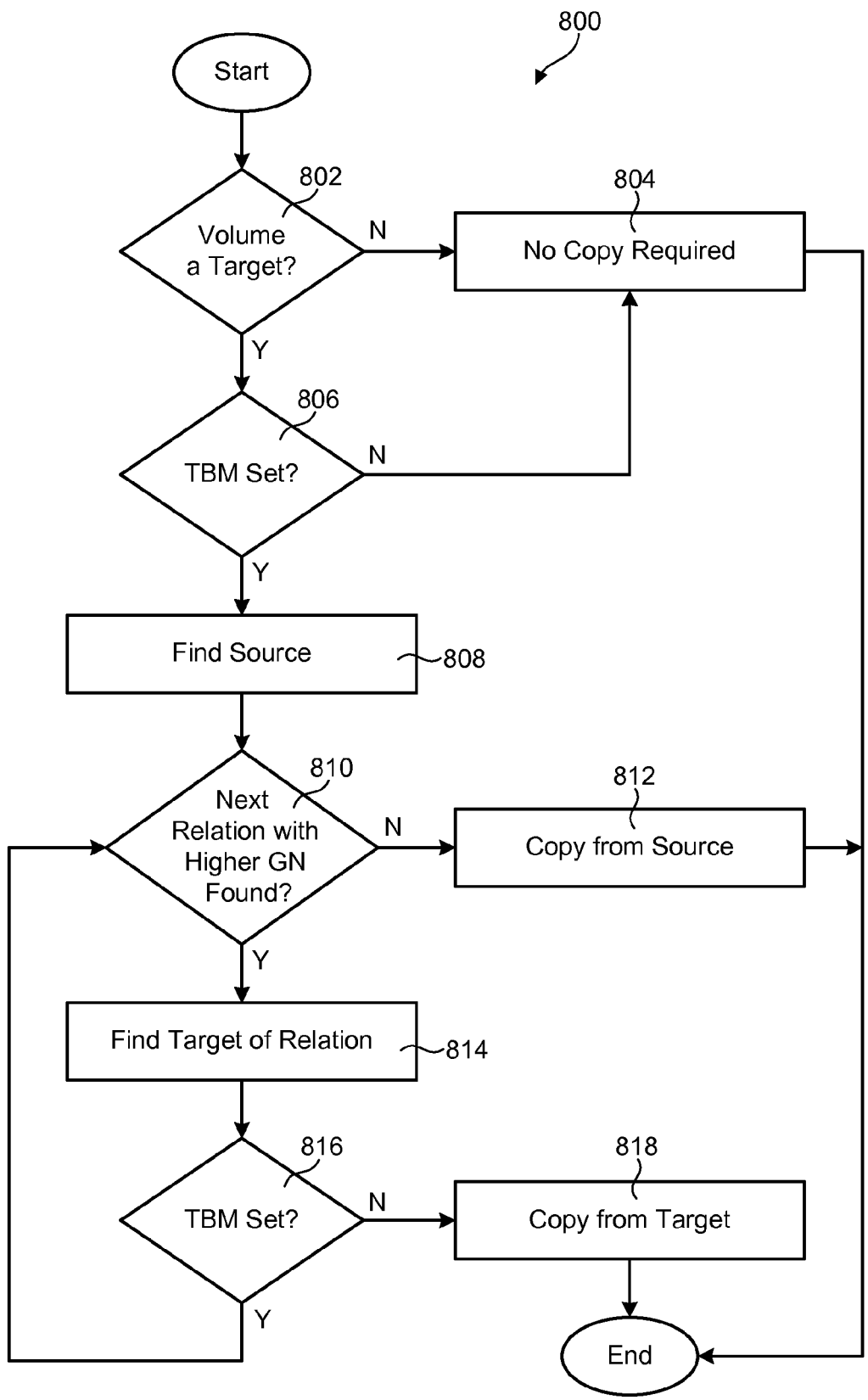
FIG. 8 is a flow diagram showing one embodiment of a method for finding a higher source (HS) volume in response to a write to a volume.

Referring to FIG. 8, one embodiment of a method 800 for finding the HS volume from which to copy data is illustrated. Such a method 800 may be used in association with step 604 of FIG. 6. As shown, the method 800 initially determines 802 whether the volume being written to is a target volume 304. If not, no copy is required as reflected at step 804. If the volume is a target volume 304, the method determines 806 whether the TBM of the volume is set. If the TBM is not set, no copy is required. If the volume is a target volume 304 and the TBM of the volume is set, the method finds 808 the source volume 302 associated with the target volume 304. The method 800 then finds the next relation with a higher generation number (GN) in the manner previously discussed.

Upon finding the next higher GN, the method 800 finds 814 the target 304 of this relation, which is a sibling of the target 304 identified at step 802. If the TBM of this sibling target 304 is not set 816 (indicating that it contains the desired data), the method 800 copies 818 the data from the sibling target 304 to the COS 304. If the TBM of this sibling target 304 is set 816 (indicating that it does not contain the desired data), the method 800 repeats steps 810, 814 to find the next younger sibling target 304 and determine 816 whether its TBM is set. In this way, the method 800 traverses through the younger siblings of the target volume 304 identified at step 802 until the sibling target volume 304 containing the desired data is found. Once this data is found, the method 800 copies 818 the data from the sibling target 304 to the COS. If no sibling target 304 containing the desired data is found, the method 800 copies 812 the data from the source volume 302 to the COS. Once the data is copied, the write may be performed on the target 304 identified at step 802.

Figure 9:
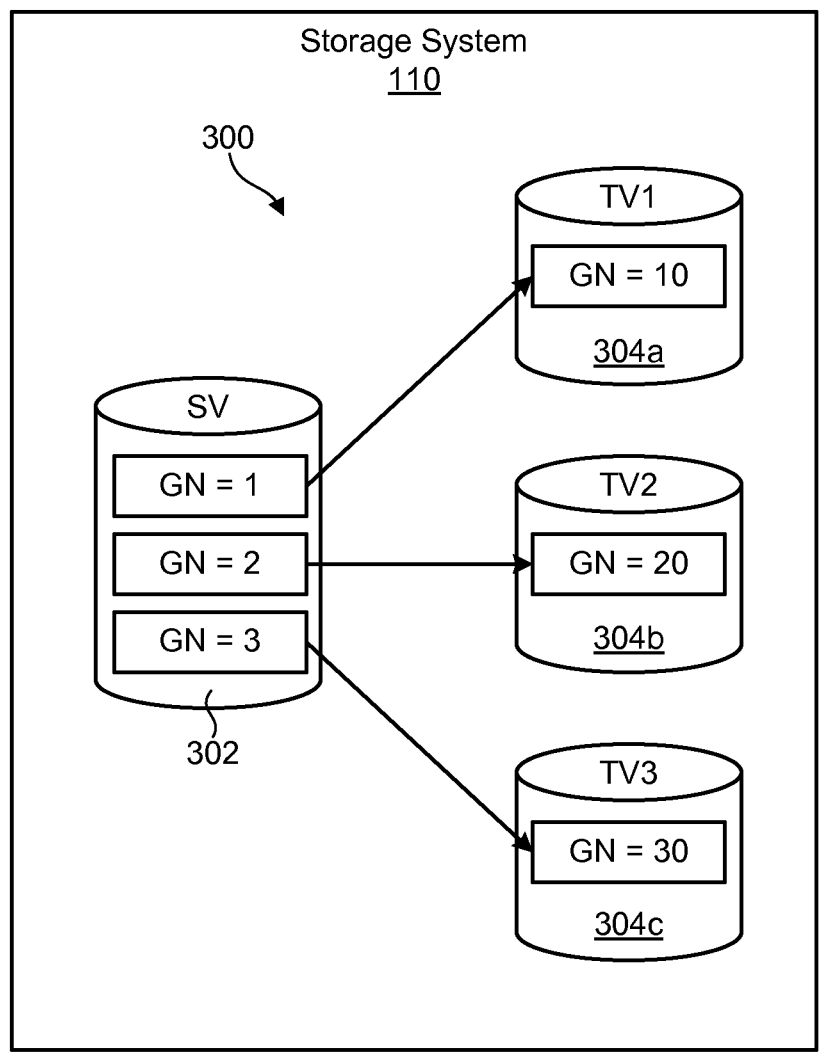
FIG. 9 is a high-level diagram showing one example of a multi-target architecture showing the use of generation numbers.

Referring to FIG. 9, one example of a multi-target architecture 300 showing the use of generation numbers (GNs) is illustrated. In this example, assume that the relation between the source volume (SV) 302 and a first target volume (TV1) 304a was created first, followed by the relation between the source volume 302 and a second target volume (TV2) 304b, followed by the relation between the source volume 302 and a third target volume (TV3) 304c. Each time a new relation is added to the source volume 302, the generation number is incremented. Thus, as shown on the source volume 302, the first relation is associated with a generation number of "1," the second relation is associated with a generation number of "2," and the third relation is associated with a generation number of "3."

Assume that relations are initially established between the source volume 302 and the first and second target volumes 304a, 304b, but the relation between the source volume 302 and the third target volume 304c is not yet established. In this scenario, to perform a write to track 1 of the second target volume 304b, the data in track 1 is copied from the source volume 302 (the higher source) to the first target volume 304a (the closest older sibling, or COS) and the TBM of the first target volume 304a is reset. The write is then performed to track 1 of the second target volume 304b and the TBM of the second target volume 304b is reset. Similarly, to perform a write to track 2 of the source volume 302, the data in track 2 is copied from the source volume 302 to the second target volume 304b (the youngest child, or YC) and the TBM of the second target volume 304b is reset (indicating that it now contains the data). The write is then performed to track 2 of the source volume 302. The data residing in the first target volume (TV1) 304a and the second target volume (TV2) 304b after the two writes described above is shown in FIG. 10. The values in the TBMs are also shown.

Assume that the third relation is now established between the source volume 302 and the third target volume 304c. To perform a write to track 3 of the source volume 302, the data in track 3 is copied from the source volume 302 to the third target volume 304c (the youngest child, or YC) and the TBM of the third target volume 304c is reset. The write is then performed to track 3 of the source volume 302. To perform a write to track 4 of the second target volume 304b, the data in track 4 is copied from the source volume 302 (the higher source) to the first target volume 304a (the closest older sibling, or COS) and the TBM of the first target volume 304a is reset. The write is then performed to track 4 of the second target volume 304b and the TBM of the second target volume 304b is reset.

To perform a write to track 5 of the first target volume 304a, no copy is made since there is no closest older sibling, or COS. The write is then performed to track 5 of the first target volume 304a and the TBM of the first target volume 304a is reset. To perform a write to track 6 of the third target volume 304c, the data in track 6 is copied from the source volume 302 (the higher source) to the second target volume 304b (the closest older sibling, or COS) and the TBM of the second target volume 304b is reset. The write is then performed to track 6 of the third target volume 304c and the TBM of the third target volume 304c is reset. The data residing in the first target volume (TV1) 304a, the second target volume (TV2) 304b, and the third target volume (TV3) 304c after all six writes described above is shown in FIG. 11. The values in the TBMs are also shown.

Figure 12:
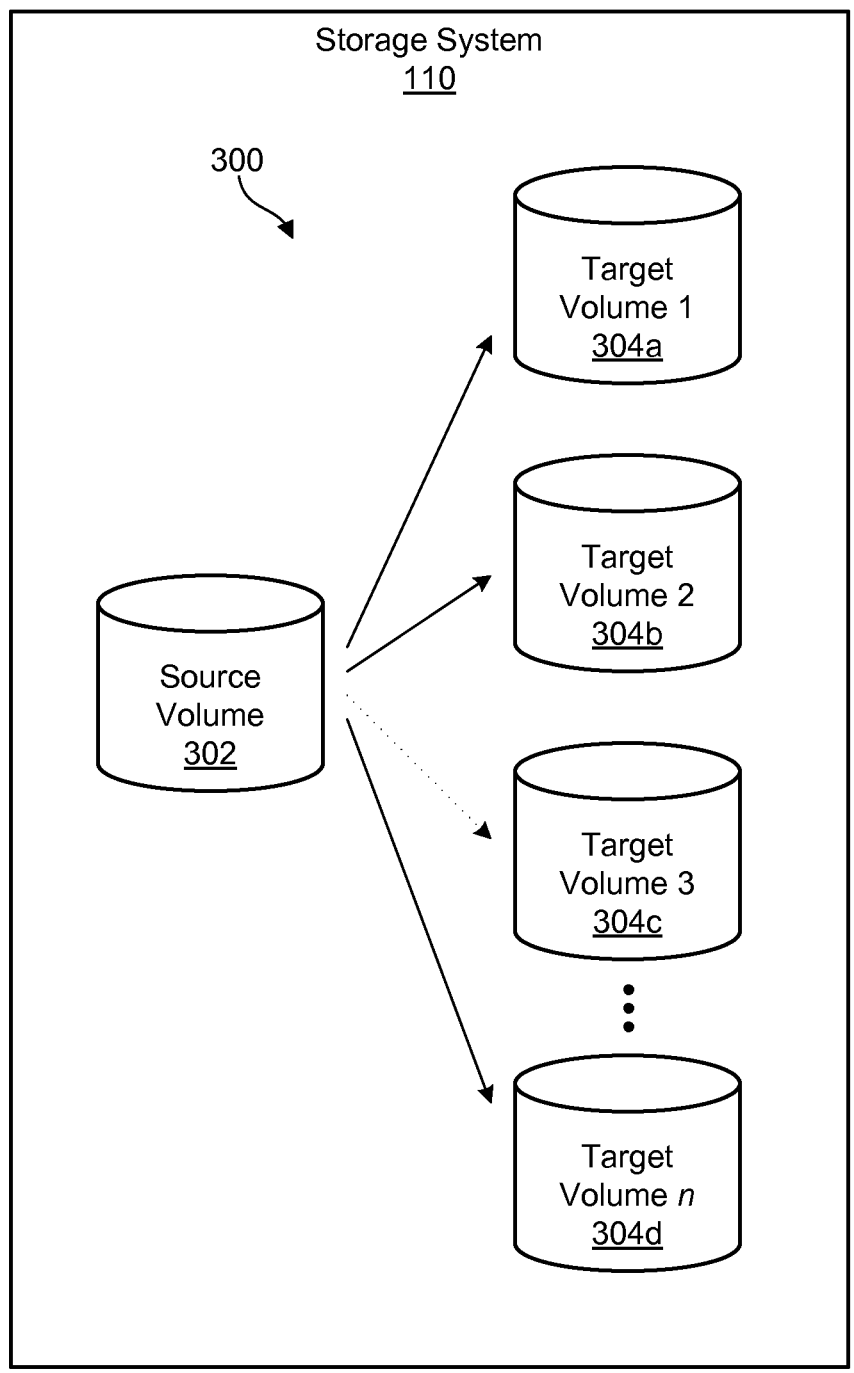
FIG. 12 is a high-level block diagram showing the deletion of a relation between a source volume and a target volume.

Referring to FIG. 12, in certain circumstances, a relation between a source volume 302 and a target volume 304, or several relations between a source volume 302 and several target volumes 304, may be deleted from a multi-target architecture 300. When a relation is deleted from a multi-target architecture 300, the point-in-time-copy relationship between the source volume 302 and the target volume 304 associated with the relation is ended. In certain embodiments, this may terminate the ability of other sibling target volumes 304 to inherit data from the target volume 304 for which the relation was deleted. Thus, in certain embodiments, prior to deleting a relation, data on the target volume 304 associated with the relation may be copied to one or more sibling target volumes 304 so that the data is still accessible to the sibling target volumes 304.

For example, assume that the relation between the source volume 302 and the target volume 304c is identified for deletion (as indicated by the dotted arrow). Prior to deleting the relation, data that is stored on the target volume 304c and inherited by other sibling target volumes 304 may be copied from the target volume 304c to one or more sibling target volumes 304 so that the data is still accessible to the sibling target volumes 304. For example, in certain embodiments, such as when using the point-in-time-copy methodology described in FIGS. 4 through 8, the data will be copied to the closest older sibling (COS). Using other point-in-time-copy methodologies, the data may be copied to other sibling target volumes 304 other than the COS. Nevertheless, for the purposes of this disclosure, it will be assumed that the data is copied to the COS. Once all the data that is stored in the target volume 304c and inherited by other sibling target volumes 304 is copied to the COS, the relation between the source volume 302 and the target volume 304c may be deleted, thereby terminating the point-in-time copy relationship between the source volume 302 and the target volume 304c.

Figure 13:
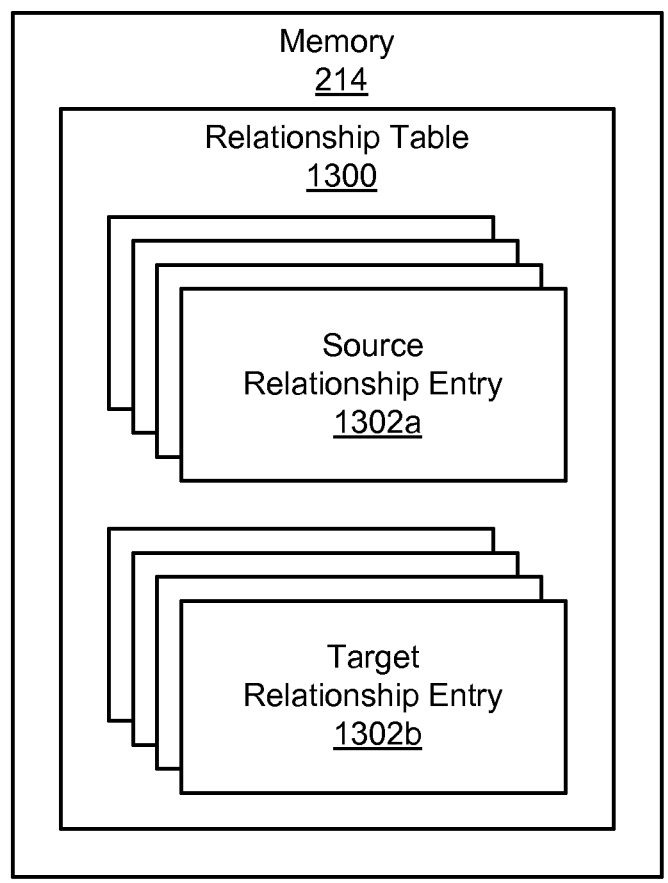
FIG. 13 is a high-level block diagram showing in-memory source and target relationship entries.

Referring to FIG. 13, in certain embodiments, a relationship table 1300 is stored in memory 214 that keeps track of each of the relations in the multi-target architecture 300. In certain embodiments, each relation has associated therewith a source relationship entry 1302a, corresponding to the source of the relation, and a target relationship entry 1302b, corresponding to the target of the relation. As will be explained in more detail hereafter, when deleting a relation, the source relationship entry 1302a and the target relationship entry 1302b associated with the relation may be marked as "deleted" to indicate that the relation is in the process of being deleted (i.e., data is being copied from the target volume 304 associated with the relation to a COS in preparation to delete the relation). Marking the relationship entries 1302a, 1302b in this manner may also ensure that data is not written to the target volume 304 since its relation is in the process of being deleted. Once all necessary data is copied from the target volume 304 associated with the relation to a COS, the relation may be deleted. Deleting the relation may include deleting the source relationship entry 1302a and target relationship entry 1302b associated with the relation from the relationship table 1300.

Figure 14:
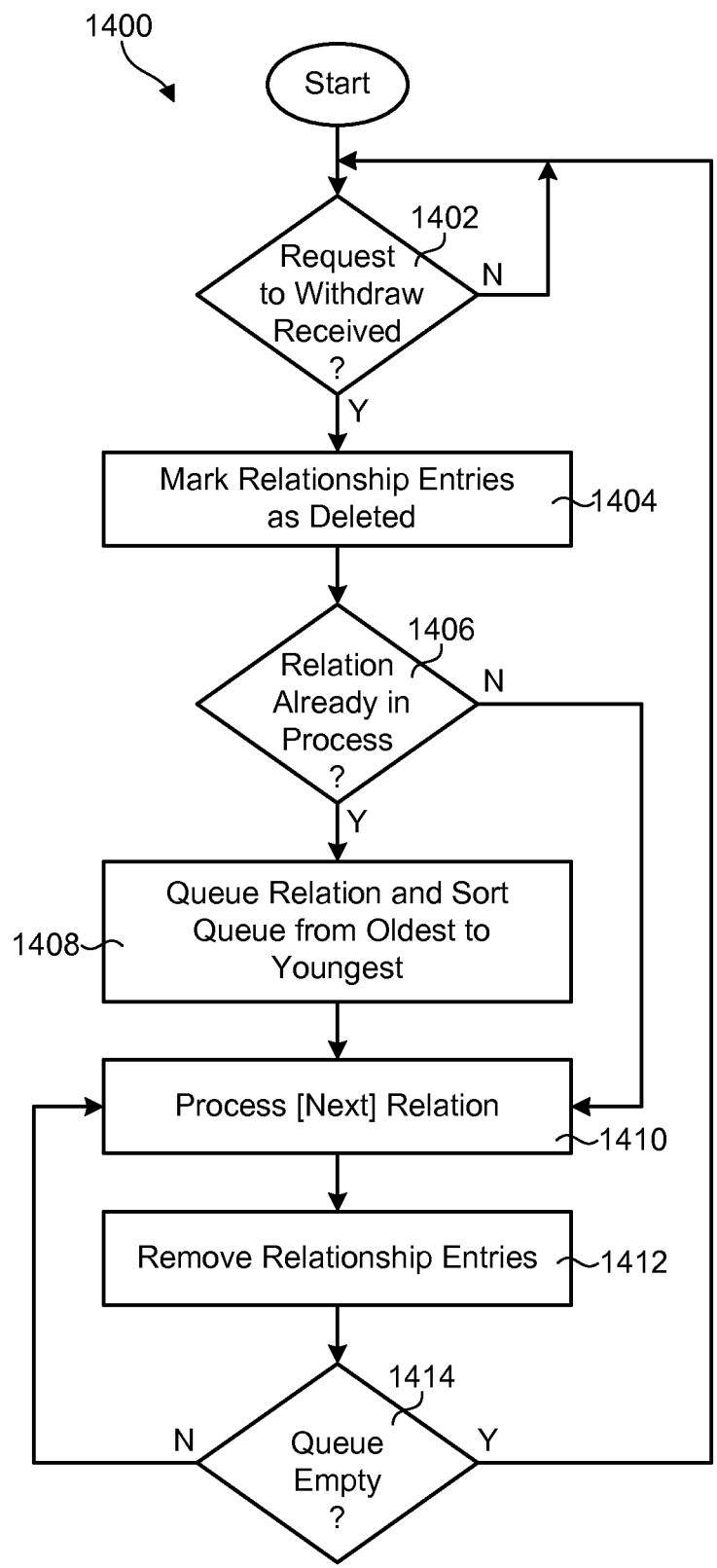
FIG. 14 is a flow diagram showing one embodiment of a method for deleting a relation between a source and a target in a multi-target architecture.

Referring to FIG. 14, one embodiment of a method 1400 for deleting a relation between a source 302 and a target 304 in a multi-target architecture 300 is illustrated. As shown, the method 1400 initially determines 1402 whether a request to withdraw (i.e., a request to delete a relation) has been received. If a request to withdraw has been received, the method 1400 marks 1404 the relationship entries associated with the relation as "deleted." This includes marking 1404 both the source relationship entry 1302a and the target relationship entry 1302b associated with the relation as "deleted." The method 1400 then determines 1406 whether a relation is already in process, meaning that data is in the process of being copied from a target 304 to a COS 304 in preparation to delete the relation.

If a relation is already in process, the method 1400 queues 1408 the relation. Upon queueing the relation, the method 1400 sorts 1408 the queue from oldest to youngest such that older relations are processed prior to younger relations. This will ensure that the number of times data is copied is minimized. For example, if data is copied to a target volume whose relation is in line to be deleted, the data may need to be copied again, wasting both time and resources. Processing the relations from oldest to youngest will help to ensure that data is copied to its final destination, thereby increasing efficiency by minimizing the number of times data is copied.

Various different methods or techniques may be used to determine the age of the relations. In certain embodiments, the age of the relations is determined using the generation numbers described in association with FIG. 9. For example, by inspecting the generation numbers on the source volume 302, the age of the relations may be readily determined. In the illustrated example of FIG. 9, because the generation number is incremented each time a new relation is generated, the relation associated with the generation number "1" is the oldest and the relation associated with the generation number "3" is the youngest. This could be reversed in other embodiments.

If no relations are in the queue, the method 1400 simply processes 1410 the relation. If one or more relations are in the queue, the method 1400 processes 1410 the next relation in the queue. Various methods for processing 1410 a relation will be described in association with FIGS. 15 and 16. Once a relation is processed, meaning that data in the target 304 associated with the relation has been examined and either copied or not copied to the closest older sibling 304 based on the examination, the method 1400 removes 1412 the relationship entries 1302a, 1302b associated with the relation from the relationship table 1300. This will terminate the relation. The method then checks 1414 whether any other relations are in the queue. If the queue is empty, the method 1400 waits 1402 for the next request to withdraw. If the queue is not empty, the method 1400 processes 1410 the next relation in the queue. This continues until all relations in the queue are processed.

In certain embodiments, the method 1400 is configured such that several relations can be in process at any particular time. That is, data may be copied simultaneously for several relations that are being deleted. In certain embodiments, the number of relations in process at any particular time may be limited so as not to overdrive storage devices 204 (e.g., disk drives, solid state drives, etc.) or device adapters 210 associated with the storage devices 204. For example, in certain embodiments, device adapters 210 and storage devices 204 may be limited to processing some number (e.g., four) of relations at any particular time to not overdrive the devices. When processing several relations simultaneously, older relations may be given priority over newer relations to minimize the number of times data is copied.

Figure 15:
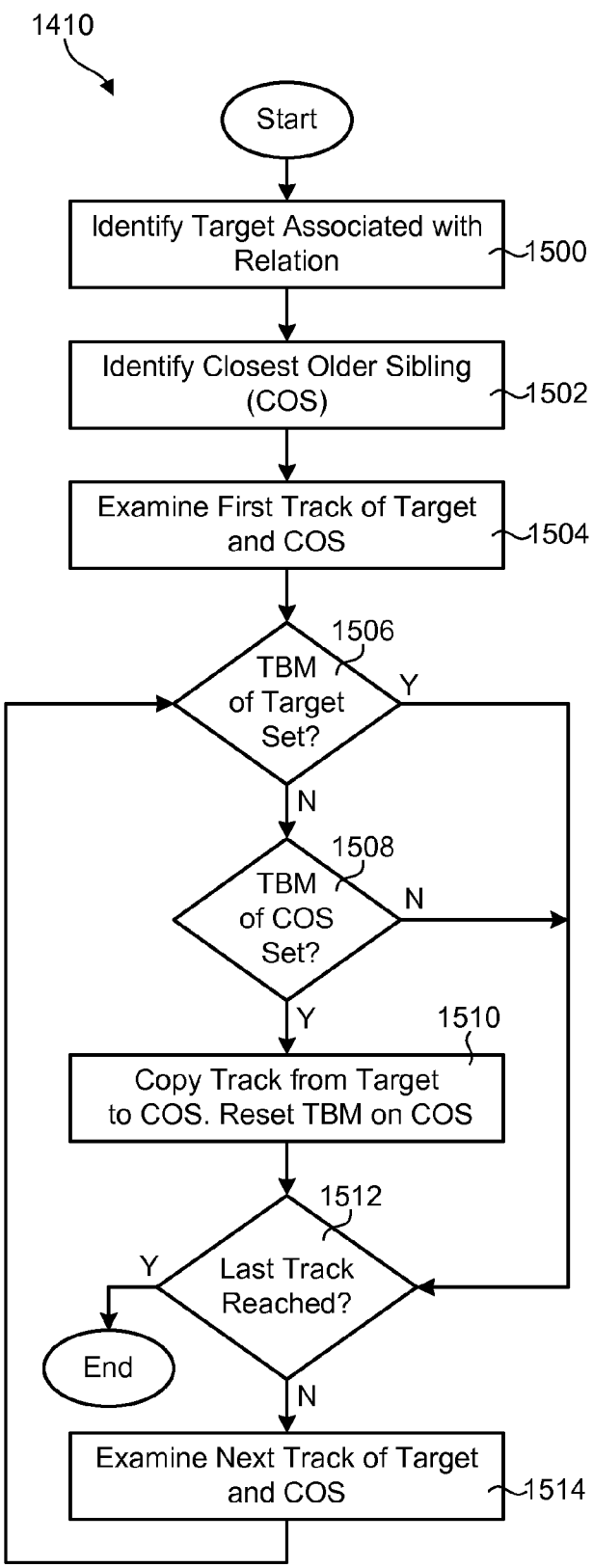
FIG. 15 is a flow diagram showing one embodiment of a method for processing a deleted relation.

Referring to FIG. 15, one embodiment of a method 1410 for processing a deleted relation is illustrated. Such a method 1410 may be executed whenever a relation is processed 1410, as described in FIG. 14. As shown, to process a relation, the method 1410 initially identifies 1500 the target associated with the relation. The method 1410 then identifies 1502 the closest older sibling (COS) of the target. The method 1410 then examines 1504 the first track of the target and the COS. If the method 1410 determines 1506 that the TBM of the target for the track is not set (indicating that the target contains a copy of the data) and determines 1508 that the TBM of the COS for the track is set (indicating that the COS does not contain a copy of the data), then the method 1410 copies 1510 the data in the track from the target to the COS. The TBM of the COS is then reset 1510 for the track to indicate that it contains a copy of the data. If, however, the TBM of the target for the track is set (indicating that the target does not contain a copy of the data) or the TBM of the COS for the track is not set (indicating that the COS already contains a copy of the data), then no copy is performed and the method 1410 proceeds to the decision step 1512.

Once the method 1410 examines a track and either copies 1510 the track or determines that no copy is necessary, the method 1410 determines 1512 whether the last track of the target 304 has been reached. If the last track has not been reached, the method 1410 examines 1514 the next track of the target and the corresponding track of the COS and repeats steps 1506, 1508, 1510, 1512. When all tracks in the target 304 have been examined and either copied or not copied to the COS based on the examination, the method 1410 ends. In this way, the method 1410 examines each track in a target 304 to determine whether data needs to be copied to a COS.

Figure 16:
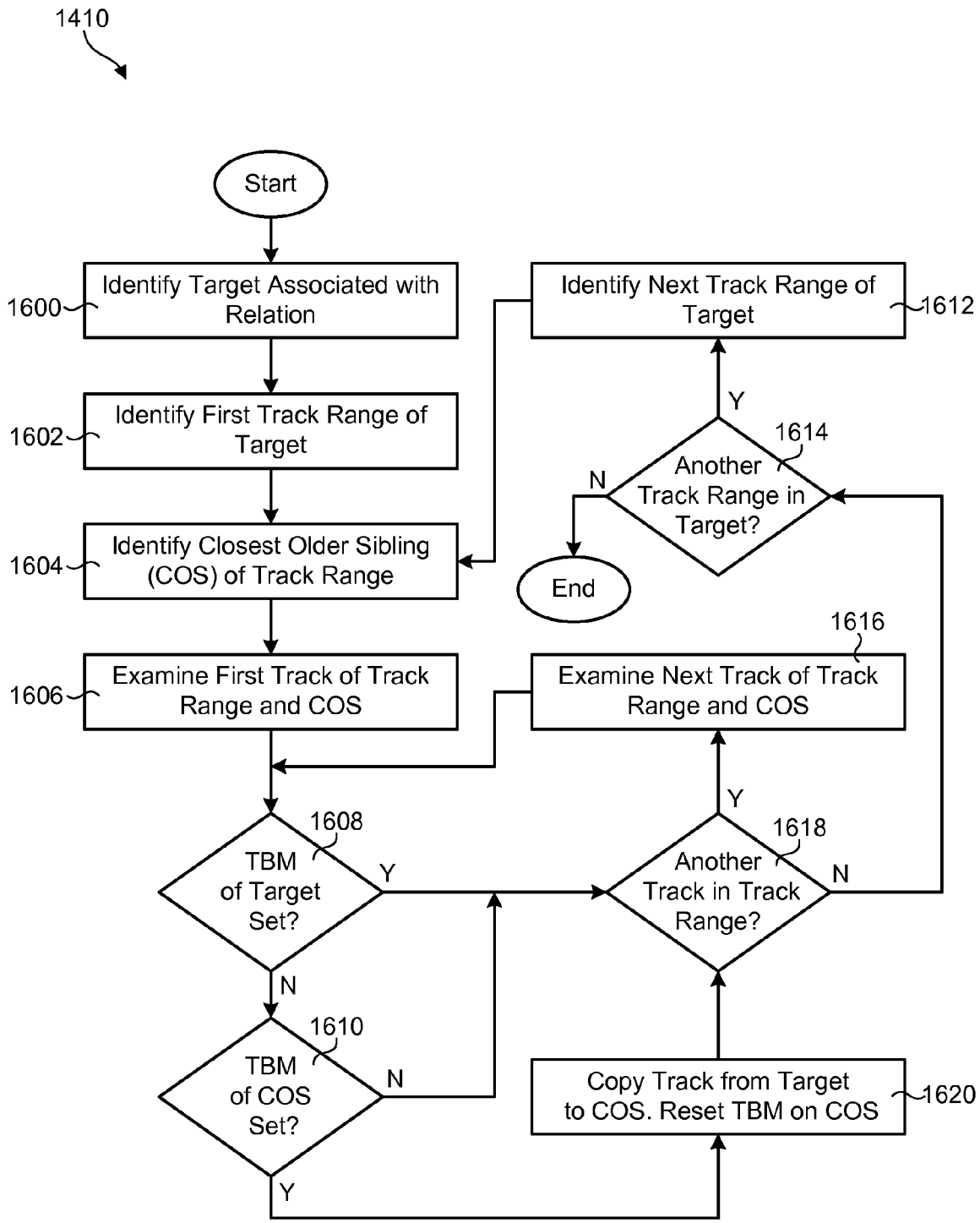
FIG. 16 is a flow diagram showing another embodiment of a method for processing a deleted relation.

Referring to FIG. 16, another embodiment of a method 1410 for processing a deleted relation is illustrated. Such a method 1410 may be executed whenever a relation is processed 1410. The method 1410 illustrated in FIG. 16 may address implementations where different ranges of tracks in a target have different closest older siblings (COSs), such as in dataset-level point-in-time-copy implementations.

As shown, to process a relation, the method 1410 initially identifies 1600 the target associated with the relation and identifies 1602 a first track range (e.g., the first fifty tracks) of the target. The method 1410 then identifies 1604 the closest older sibling (COS) associated with the track range. The method 1410 then examines 1606 the first track of the track range and the corresponding track of the COS. If the method 1410 determines 1608 that the TBM for the track in the track range is not set (indicating that the track contains a copy of the data) and determines 1610 that the TBM for the corresponding track of the COS is set (indicating that the track in the COS does not contain a copy of the data), then the method 1410 copies 1620 the data from the track in the track range to the corresponding track in the COS. The TBM for the track in the COS is then reset 1620 to indicate that it now contains a copy of the data. If, however, the TBM for the track on the target is set (indicating that the target does not contain a copy of the data) or the TBM of the COS for the corresponding track is not set (indicating that the COS already contains a copy of the data), then no copy is performed and the method 1410 proceeds to the decision step 1618.

Once the method 1410 examines a track in the track range and either copies the track or determines that no copy is necessary, the method 1410 determines 1618 whether another track in the track range exists. If another track in the track range does exist, the method 1410 examines 1616 the next track of the track range along with the corresponding track in the COS by repeating steps 1608, 1610, 1620, 1618. When all tracks in the track range have been examined and either copied or not copied to the COS based on the examination, the method 1410 determines 1614 whether there is another track range in the target. If there is another track range, the method 1604 identifies 1604 the COS for the track range and repeats steps 1606, 1608, 1610, 1620, 1618, 1616 for the track range and the identified COS. This continues until all tracks within all track ranges of the target have been examined and either copied or not copied to a COS. Once all tracks in all track ranges of the target have been examined and either copied or not copied, the method 1410 ends. In this way, the method 1410 is able to address implementations where different ranges of tracks in a target may have different closest older siblings.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A computer program product for deleting a relation between a source and a target in a multi-target architecture, the multi-target architecture comprising a source and a plurality of targets mapped thereto, the computer program product comprising a non-transitory computer-readable storage medium having computer-usable program code embodied therein, the computer-usable program code comprising:
    computer-usable program code to identify a first relation for deletion from the multi-target architecture, wherein the first relation establishes a point-in-time-copy relationship between the source and a target;
    computer-usable program code to identify a sibling target in a point-in-time-copy relationship with the source that inherits data from the target;
    computer-usable program code to copy the data from the target to the sibling target; and
    computer-usable program code to delete the first relation, thereby terminating the point-in-time-copy relationship between the target and the source.

2. The computer program product of claim 1, wherein the sibling target is the closest older sibling (COS) of the target.

3. The computer program product of claim 1, wherein copying the data from the target to the sibling target comprises (1) identifying data stored in the target that is not stored in the sibling target, (2) copying the data that is stored in the target but not stored in the sibling target from the target to the sibling target.

4. The computer program product of claim 3, further comprising computer-usable program code to identify a second relation for deletion from the multi-target architecture.

5. The computer program product of claim 4, further comprising computer-usable program code to determine whether the second relation is older than the first relation.

6. The computer program product of claim 5, wherein determining whether the second relation is older than the first relation comprises finding the source associated with the first and second relations, and comparing generation numbers associated with the first and second relations to determine which relation is older.

7. The computer program product of claim 4, further comprising computer-usable program code to delete the second relation before the first relation if the second relation is older than the first relation.

8. The computer program product claim 4, further comprising computer-usable program code to delete the first relation before the second relation if the first relation is older than the second relation.

9. The computer program product of claim 1, wherein identifying a first relation for deletion further comprises marking a relationship entry associated with the first relation as deleted.

10. The computer program product of claim 9, wherein deleting the first relation further comprises deleting the relationship entry associated with the first relation.

* * * * *